United States Patent Office 2,897,135
Patented July 28, 1959

2,897,135

HYDROCARBON CONVERSION PROCESS AND CATALYST

Thomas F. Doumani, Whittier, Calif., assignor to Union Oil Company of California, Los Angeles, Calif., a corporation of California No Drawing. Application January 31, 1957
Serial No. 637,365

18 Claims. (Cl. 208—112)

This invention relates to improved hydrocarbon conversion processes embracing hydrogenation-dehydrogenation type reactions, and to certain novel catalysts for use therein, and to novel methods for preparing such catalysts. The crux of the invention revolves about the catalysts employed, and their method of preparation. These catalysts consists essentially of one or more transitional metals, or compounds thereof such as oxides, sulfides, and sulfates, said catalysts being activated in a novel manner by first pretreating them with ozone at low temperatures and then reducing with hydrogen, preferably at a higher temperature. It is found that the ozone pretreatment, followed by hydrogen reduction, results in catalysts of enhanced activity in hydrocarbon conversions involving hydrogenation and/or dehydrogenation reactions. The explanation for the improved activity is not completely understood, but is thought to involve a novel physical state of the active metal brought about by low temperature peroxidation, followed by a hydrogen reduction step. This enhanced activity is observed in typical hydrocarbon conversions such as desulfurization, denitrogenation, reforming, dehydrogenation, hydrogenation, hydrocracking and the like.

It will be apparent therefore that the major object of the invention is to improve the activity of transitional metal catalysts with respect to the hydro-activation of C–H bonds, C–N bonds, and C–S bonds in organic compounds. The practical object is to increase the degree of conversion obtainable under a given set of conditions with a given catalyst. A further object is to provide economical means for improving the activity of catalysts by subjecting them to an oxidation-reduction cycle. These and other objects are achieved by the methods described herein as will be apparent from the more detailed description which follows:

It is known in general that the activity of transitional metal catalysts can be improved by subjecting them to oxidation-reduction cycles. The process of raising the metal to a high valence state, and then reducing back to a lower valence state, effects some little-understood change in the physical state of the active component, generally resulting in improved activity. It has now been found that the improvement in activity is even further accentuated where the oxidation is conducted with ozone at a low temperature. Even better results are obtained by following the low temperature oxidation step with a two-stage hydrogenation sequence, the first at a relatively low temperature, and the second at a relatively high temperature. Ozone is particularly well adapted for the low temperature oxidation, and produces novel effects involving the formation of peroxides, or persulfates on the catalyst. In the succeeding reduction step these per-oxidized components are usually reduced to sulfides, oxides, or the free metal.

The active metals which may be employed herein consist of the transitional metals, i.e. those metals containing their differentiating electron in the second-from-outermost shell. This includes specifically the metals titanium, vanadium, chromium, manganese, iron, cobalt, nickel, copper, zinc, zirconium, molybdenum, ruthenium, rhodium, palladium, cadmium, tantalum, tungsten, osmium, iridium, platinum, mercury, thorium, and uranium. These metals may be employed in free form, or in the form of oxides, sulfides or sulfates. In the usual case the final active component will comprise mixtures of the free metal and the oxide, or the oxide and the sulfide, or other combinations. The metals or their compounds may be employed singly, or in admixture with one or more other metal components.

A preferred class of metals comprises the group VI–B and group VIII members, and particularly combinations of one or more group VI–B metals with one or more group VIII metals.

The active component may be employed in substantially undiluted form, but preferably is distended and supported on an adsorbent carrier in proportions ranging between about 0.5% and 25% by weight. Suitable carriers include in general the difficultly reducible adsorbent inorganic oxides, for example silica gel, alumina gel, mixtures of silica and alumina gels, zirconia, titania, magnesia, beryllia, and mixtures thereof. Various natural clays may also be employed after suitable activation by heat and/or acid treatment. Such clays include for example the various montmorillonite clays such as bentonite. These carriers are ordinarily compressed into tablets of suitable size, and the active materials added thereto by impregnation with aqueous solutions of salts thereof. The impregnated carrier is then dried and activated at temperatures of from 500° to 1500° F. in order to decompose the impregnated salt to the active form desired.

Other methods of compounding may be employed to somewhat less advantage, including co-precipitation of the active component along with the carrier from a mutual solution, again followed by activation. The least advantageous method consists in merely grinding the dry materials together and compressing them into tablet form. Where it is desired to use the catalyst in fluidized processes, the powdered carrier may be impregnated with a solution of the active metal desired, or both may be co-precipitated as a hydrous gel, followed by drying, calcining and grinding.

After final compounding of the desired ingredients and activation thereof by heating, the catalyst is in condition for the ozone oxidation step. This step is ordinarily performed by simply passing a mixture of ozone and air, or ozone and oxygen, over the catalyst at temperatures between about −50° and 570° F., preferably between about 0° and 390° F. Normally, pure ozone cannot be employed except at very low temperatures because of the unfavorable equilibrium constant with oxygen. However, conventional electrical discharge methods for generating ozone can produce streams containing from about 1% to 10% thereof which are stable at 0° to 130° F. for several minutes, sufficient to accomplish the desired oxidation.

The time of passage of ozone, i.e. the contact time with the catalyst, will depend upon the metal content of the catalyst, and the percentage of ozone in the contacting gas, as well as upon the chemical state of the active metal. The free metals and the sulfides will normally require a somewhat longer contact time. The free metals must absorb sufficient ozone to be converted at least partially into normal oxides, and then perhaps into peroxides; the sulfides are usually converted first to sulfates, and then at least partially into persulfates. The oxides and sulfates theoretically need absorb only sufficient ozone to form peroxides or persulfates. Completion of the ozone treatment may be detected either by periodically measuring the ozone content in the effluent gas stream until an unchanging level is reached, or by comparing the temperature in the contacting bed with the temperature of the incoming gas. The absorption of ozone is exothermic, and hence when the bed temperature levels out at the temperature of the incoming gas stream, the absorption may be judged complete.

The ozone stream may contain anywhere between about 1% and 40% by volume of ozone, and preferably between about 2% and 20%. The rate of passage of the stream over the catalyst is not critical, and hence any suitable flow rate may be used, so long as the rate is so correlated with the contacting temperature that not all the ozone has reverted to oxygen before it traverses the catalyst bed.

After the ozone treatment, the catalyst may if desired be treated with certain selective retarding agents such as hydrogen sulfide. Preferably the hydrogen sulfide treatment is conducted at low temperatures, e.g. 0 to 200° F. This treatment is found to retard the cracking activity of the catalyst, i.e. its tendency to promote scission of C—C bonds. Where hydrocarbon cracking reactions are not a problem, as in low temperature hydrogenations, the hydrogen sulfide treatment is usually of little advantage. However, it may be of considerable advantage in high temperature reactions involving dehydrogenation.

The ozonized catalyst, with or without an intervening sulfiding step, is then subjected to reduction with hydrogen. The hydrogen reduction is performed by passing a stream of hydrogen, or mixtures containing hydrogen, over the catalyst at temperatures which, for at least the terminal portion of the contact time, are between about 500° and 1200° F. The contact time with hydrogen will depend upon the temperature, and the proportion of active metal in the catalyst, and its chemical makeup. Generally contact times between about 30 minutes and 24 hours are used preferably between about 1 hour and 10 hours. In a preferred modification, the catalyst is first reduced in a hydrogen stream at low temperatures, e.g. 50° to 700° F. for 1 to 3 hours, and then reduced at a higher temperature falling within the range of about 500° to 1200° F. for 1 to 10 hours. The high temperature treatment may take place after the catalyst is placed on-stream in contact with hydrogen and the hydrocarbon feed which is to be treated. The low temperature hydrogenation followed by the high temperature hydrogenation is found to yield superior catalysts as compared to a high temperature treatment alone. To accomplish the dual-temperature hydrogenation, the treatment may preferably be started at the low temperature, and then gradually raised over several hours to the maximum temperature desired. For best effect, the high temperature treatment should be at least about 200° F. higher than the low temperature treatment.

The most obvious effects of the hydrogenation treatment are to reduce any peroxides or persulfates present on the catalyst, and to convert easily reducible sulfides to free metals, and perhaps to convert higher oxides to lower oxides. These chemical effects, however, are not regarded as the primary objects in the treatment; the primary object is to effect a novel physical transformation or redistribution of the active centers, and/or to induce an optimum crystal state of the active component. In view of the complexity of possible reactions, however, it is manifest that the results described herein must be regarded as empirical, and the foregoing considerations are merely theoretical, and are not intended to be limiting.

The finished catalysts of this invention may be employed in many and varied hydrocarbon conversion reactions. For example, in desulfurization they may be employed to desulfurize various hydrocarbon fractions, e.g. gasolines, kerosenes, gas oils and even crude oils. The temperatures for this process normally range between about 600° and 900° F., pressures between about 50 and 5000 p.s.i.g., liquid hourly space velocities between about 0.2 and 10, and hydrogen rates between about 50 and 5000 c.s.f. per barrel of feed. Preferred catalysts for desulfurization include especially the combination of a group VI–B metal oxide or sulfide with a group VIII metal oxide or sulfide. Particularly valuable catalysts comprise cobalt oxide plus molybdenum oxide, or tungsten sulfide plus nickel sulfide, supported on alumina, or silica-stabilized alumina.

In the process generally referred to as reforming, or "hydroforming," the catalyst may be employed for the upgrading of gasolines at reaction temperatures of about 800° to 1100° F., pressures between about 100 and 600 p.s.i.g., space velocities between about 0.2 and 4.0, and hydrogen rates of about 500 to 10,000 s.c.f. per barrel of feed. This process effects aromatization and isomerization, resulting in substantial improvements in octane rating. Simultaneously, efficient desulfurization and denitrogenation may be obtained. Catalysts particularly useful in this process comprise the group VI–B metal oxides, e.g. molybdenum oxide, tungsten oxide, and chromium oxide. If desired a small proportion of nickel oxide or cobalt oxide may be added. Also the noble metals are useful, especially platinum, rhodium, and palladium. These catalysts are ordinarily supported on alumina, or silica-stabilized alumina for best results. The concentration of the group VI–B metals should range between about 3% and 20% by weight of the total catalyst, while the noble metals require concentrations of only about 0.05% to 1% by weight.

Where the catalysts are employed primarily for denitrogenation, substantially similar conditions to those employed for desulfurization may be used, except that slightly higher temperatures are usually preferable, e.g. from about 750° to 1000° F. The catalysts useful in desulfurization are also useful for denitrogenation.

Certain of the catalysts described herein may also be employed for hydrocracking high-boiling stocks, e.g. gas oils or cracking cycle stocks, to produce substantial yields of gasoline-boiling-range material. Conditions optimum for hydrocracking include temperatures of about 800° to 1100° F., pressures between about 400 and 5000 p.s.i.g., space velocities between about 0.2 and 4, and hydrogen rates between about 500 and 10,000 s.c.f. per barrel of feed. In hydrocracking, the preferred carriers are the acidic compositions such as acid treated, high-silica clays, synthetic silica-alumina gels containing e.g. 60% to 90% silica, silica-magnesia, silica-zirconia, silica-zirconia-titania, and the like. These carriers are preferably impregnated with between about 1% and 10% by weight of a hydrogenating component which may comprise any one or more of the transitional metals, their oxides, sulfides, or sulfates. The metals, nickel, cobalt, chromium, molybdenum, and tungsten, are particularly valuable. Smaller amounts, e.g. 0.05% to 1% by weight, of platinum, palladium, iridium, or rhodium, may also be used.

In hydrocracking, an especially active catalyst comprises a base composed of between about 10% and 30% by weight of silica, 15% to 65% of zirconia, and 15% to 65% of titania, preferably in co-precipitated form. This catalyst is active per se, but its activity is further promoted by the incorporation of between about 0.2% and 8% by weight of a group VI–B, or group VIII metal, either in free form, or as the oxide, sulfide, or sulfate. This type of catalyst is found to be extremely selective in hydrocracking activity, in that the gasoline produced therefrom is richer in cyclic compounds than that obtained with other catalysts. The antiknock quality of the gasoline is hence improved. By treating the catalyst with ozone as described, the overall activity is even further improved.

In any of the foregoing processes, the catalyst will eventually decline in activity due to the deposition of coke, tars, sulfur, or other inactivating deposits. When this occurs, the catalyst may be regenerated to substantially its original activity by oxidizing at temperatures of 500° to 1500° F. in a stream of oxidizing gas, e.g. air, or air diluted with flue gases. Following the oxidation with air, which burns off the inactivating deposits, the catalyst must then be treated at low temperatures with ozone as previously described if it is desired to restore the original activity. Following hydrogen reduction, the catalyst is then again ready for use.

The invention is further illustrated by the following examples, but they are not intended to be limiting in scope:

EXAMPLE I

A nickel-containing catalyst was prepared by impregnating a coprecipitated, 95% alumina-5% silica gel carrier, in the form of ⅛ inch pellets, with an aqueous nickel sulfate solution. A composition containing 14.5% by weight of $NiSO_4$ was obtained.

A portion of this material after drying and calcining, was contacted for 4 hours at about 85° F. with a stream of ozonized oxygen containing about 6% ozone. The oxygen rate was about 10 s.c.f./hour. The catalyst was then contacted with a slow stream of hydrogen gas at atmospheric pressure and 625° F. for several minutes, and then at 900° F. for about 2 hours. The resulting catalyst contained a mixture of nickel and nickel sulfide. Another portion of the impregnated $NiSO_4$ catalyst was treated with a stream of ozone-free oxygen under the same conditions, and subsequently reduced with hydrogen as above described.

Each of the above catalysts was then tested for reforming activity using a 200°–400° F. boiling range California straight-run naphtha. The processing conditions were:

Temperature _____ 900° F.
Pressure _____ 450 p.s.i.g.
Liquid hourly space velocity _____ 2.0
Hydrogen _____ 5000 s.c.f./bbl.

The following results were obtained:

Table 1

| Catalyst treatment | Liquid yield, vol. percent $C_4+$ | Research octane rating | | Gas make | |
|---|---|---|---|---|---|
| | | Clear | +3 ml. TEL | $H_2$ | $C_2$–$C_3$ |
| Ozone | 90.6 | 85.5 | 94.5 | 709 | 129 |
| Oxygen | 91.5 | 82.0 | 93.5 | 548 | 112 |
| Feed | | 66 | 78 | | |

It is apparent that the ozone-treated catalyst is markedly more active, as indicated by the 29% higher hydrogen gas make, and the improved octane ratings. The decrease in liquid yield for the ozone-treated catalyst is almost entirely attributable to increased aromatization, as indicated by the high hydrogen gas make, compared to a dry gas make which is only insignificantly higher.

EXAMPLE II

The alumina-silica carrier of Example I was impregnated first with an ammoniacal ammonium molybdate solution, then after drying, was re-impregnated with an aqueous cobalt nitrate solution, drained, dried, and finally activated by heating at 1100° F. for 2 hours. The resulting base catalyst contained about 8.6% $MoO_3$ and 3.0% CoO, and is designated herein as catalyst A.

Portions of catalyst A were then separately impregnated with various aqueous solutions of metal sulfates, including cuprous sulfate, nickel sulfate, ferrous sulfate, zinc sulfate, and cadmium sulfate in order to modify the cracking activity of the base catalyst. The finished catalysts, after calcining, were then tested for reforming activity, using the same charge stock and reaction conditions as described in Example 1. The results were as follows:

Table 2

| Catalyst | Metal sulfate | | Liquid yield, vol. percent of feed | Research octane rating | |
|---|---|---|---|---|---|
| | Formula | Weight percent | | Clear | Plus 3 ml. TEL |
| B | $CuSO_4$ | 2.62 | 97.0 | 80.0 | 93.5 |
| C | $NiSO_4$ | 2.51 | 96.0 | 82.5 | 94.0 |
| D | $FeSO_4$ | 2.46 | 94.3 | 79.5 | 92.5 |
| E | $ZnSO_4$ | 2.57 | 93.8 | 80.5 | 93.5 |
| F | $CdSO_4$ | 3.28 | 97.0 | 77.0 | 91.5 |

When the same experiment was repeated using the unmodified base catalyst A, the reaction was extremely exothermic and proper temperature control could not be maintained, resulting in a liquid yield of about 50%.

When catalyst A is treated with 6% ozonized oxygen, followed by hydrogen reduction as described in Example I, and then employed for reforming under somewhat milder conditions (875° F., 3.0 space velocity), good liquid yields of product are obtained, averaging 94.0 leaded octane rating.

When catalyst A is similarly treated with 6% ozonized oxygen, and reduced with hydrogen, but is then partially sulfided by contact with a 90% hydrogen-10% $H_2S$ stream at 80° F. for 1 hour, the resulting catalyst may then be employed for reforming under the conditions of Example I, and gives about 90% yield of gasoline having octane ratings of about 89 clear, and 99+ leaded.

When catalysts B, C, D, E, and F are similarly treated with 6% ozonized oxygen, and then reduced with hydrogen at 625° and 900° F., the products obtained by reforming under the conditions of Example I are found to average 1.5 points higher in leaded octane rating, and 3 points higher in clear octane rating, than the corresponding values in Table 2. Slightly poorer results are obtained when the 625° F. reduction step is omitted.

EXAMPLE III

A molybdenum oxide-alumina catalyst was prepared by immersing the alumina-silica carrier of Example I in an ammoniacal ammonium molybdate solution, draining, drying, and heating at 1100° F. for about 2 hours, to obtain a catalyst containing about 9.0% $MoO_3$.

Reforming under the condition of Example I gives 88.9% liquid yield of a product having octane ratings of 88.5 clear, and 98.0 leaded.

When the catalyst is treated with 6% ozone-oxygen, followed by hydrogen reduction as in Example I, the gasoline yield upon reforming is about 88%, and the octane ratings are about 91 clear and 100+ leaded.

EXAMPLE IV

The 9% $MoO_3$ catalyst of Example III was further impregnated with 2.46% by weight of nickel sulfate, and the resulting catalyst gave, under the same reforming conditions, 92.8% liquid yield of a gasoline whose octane ratings were 87.5 clear, and 97.5 leaded. The nickel sulfate thus represses the cracking activity, giving about 3% higher liquid yield of a product which is only slightly lower in octane number.

When this catalyst is treated with 6% ozone-oxygen, followed by hydrogen reduction as in Example I, the liquid yield is about 92%, but the octane ratings are substantially the same as those of Example III for the pure $MoO_3$-alumina catalyst. This shows that the combination of selective retardation with nickel sulfate, followed by ozone activation, gives a catalyst which is both more active and more selective than the un-modified $MoO_3$ catalyst.

EXAMPLE V

The 9% MoO₃ catalyst of Example III was further impregnated with 6.0% by weight of CoSO₄, and the resulting catalyst gave, under the same reforming conditions, 92.2% liquid yield of a product whose octane ratings were 79.5 clear and 92.5 leaded.

When this catalyst is treated with 6% ozone-oxygen followed by hydrogen reduction as in Example I, the gasoline yield from reforming is about 91% and the octane ratings are markedly improved (89 clear and 98 leaded).

EXAMPLE VI

A sulfided nickel oxide-alumina catalyst was prepared as follows: About 433 gms. of the 95% Al₂O₃-5% SiO₂ carrier of Example I was impregnated with a solution prepared by dissolving 636 gms. of Ni(NO₃)₂6H₂O in sufficient distilled water to give 500 ml. of solution. The catalyst was then dried at 250° F., and activated by heating at about 600° F., and was then found to contain 15.8% of NiO.

A portion of this catalyst was then sulfided with H₂S at 100–178° F. for 48 hours at about 100 p.s.i.g., and then reduced with hydrogen for 2 hours at 900° F. and 450 p.s.i.g. The resulting catalyst, under the reforming conditions of Example I, is found to give 88.8% by volume of gasoline having octane ratings of 88.5 clear and 97.5 leaded.

By treating another portion of the NiO catalyst with 6% ozone-oxygen for 4 hours at 75° F., and then sulfiding and reducing with hydrogen as in the foregoing paragraph, the activity of the catalyst is improved, a leaded octane rating of 99+ being obtained at substantially the same liquid yield.

EXAMPLE VII

A series of noble metal reforming catalysts was prepared by impregnating the carrier of Example I with appropriate aqueous solutions of chloroplatinic acid, rhodium chloride, palladium chloride, ruthenium chloride and iridium chloride, followed by calcining at 900° F. Some of the catalysts were also impregnated with dilute HF to deposit fluorine on the catalysts. Reforming under the conditions of Example I gave the following results:

*Table 3*

| Catalyst | Liquid yield, vol. percent | Octane rating, F-1 | |
|---|---|---|---|
| | | Clear | +3 ml. TEL |
| (1) 0.2% Pt—0.5% F | 88.4 | 88 | 97 |
| (2) 0.2% Rh—0.5% F | 90.2 | 87.5 | 97 |
| (3) 0.1% Rh | 92.3 | 79.5 | 92.5 |
| (4) 0.1% Pd | 95 | 62.0 | 81.5 |
| (5) 0.1% Ru | 95.3 | 65.0 | 82.5 |
| (6) 0.1% Ir | 94.7 | 75.0 | 88.5 |
| Feed | | 66 | 78 |

By treating each of the foregoing catalysts with 6% ozone-oxygen and then reducing with hydrogen as described in Example I, it is found that an average increase in clear octane rating of 3 points, and in leaded rating of 1.5 points is obtained, at liquid yields usually only about 1% lower than those shown.

EXAMPLE VIII

A CoO—MoO₃ catalyst was prepared by alternate impregnation of the 95% Al₂O₃-5% SiO₂ carrier with ammonium molybdate and cobalt nitrate, as described in Example II to obtain a composition containing 9.1% MoO₃ and 4.4% CoO by weight.

This catalyst was then used for desulfurizing and denitrogenating an educted shale oil distillate having an API gravity of 27.2 at 60° F. The conditions of the run were: Temperature—770° F., pressure—1100 p.s.i.g., 4,000 s.c.f. of hydrogen per barrel of feed, and 1.0 liquid hourly space velocity. The sulfur was reduced from 0.74% by weight in the feed to 0.09% in the product; the nitrogen was reduced from 1.72% to 0.56%.

When the same catalyst is pretreated with 6% ozone-oxygen, followed by hydrogen reduction as in Example I, the desulfurization and denitrogenation activity is improved to the point that the product sulfur is only about 0.06%, and the nitrogen content about 0.4%, under the foregoing test conditions.

EXAMPLE IX

A vanadium oxide catalyst was prepared by twice impregnating activated bauxite (Porocel) with a solution of ammonium-metavanadate in 20% ammonium sulfide. After drying and calcining, the catalyst contained 18.5% by weight of V₂O₅.

This catalyst was then employed for desulfurizing and reforming a 200°–400° F., thermally cracked naphtha from a California crude oil. The stock originally contained 1.3% by weight of sulfur and 12.7 vol. percent of aromatics.

The test conditions were:

| | |
|---|---|
| Temperature | 950° F. |
| Pressure | 100 p.s.i.g. |
| L.H.S.V. | 1.0. |
| Hydrogen | 3000 s.c.f./bbl. |

The product was found to contain 0.037% sulfur and 29.4 vol. percent of aromatics.

When this catalyst is treated with 6% ozone-oxygen followed by hydrogen reduction as in Example I, and then tested as above, the product sulfur is only about 0.021% and the aromatic content is about 31% by volume.

EXAMPLE X

A series of hydrocracking catalysts was prepared as follows:

The base, containing 30% TiO₂, 50% ZrO₂, and 20% SiO₂, was prepared by slowly adding with stirring, an acidic aqueous solution of zirconium sulfate and titanium tetrachloride to an ammoniacal sodium silicate solution. The coprecipitated gel was then washed, dried, formed into ⅛" pellets, and calcined at 900° F. for 18 hours.

Various promoters were then added to separate portions of the base, as follows:

*Catalyst G*—Base was impregnated with aqueous nickel sulfate, dried, reduced with hydrogen at 400° C. for 4 hours.

*Catalyst H*—Same as catalyst G, except cobalt sulfate was substituted for nickel sulfate.

*Catalyst J*—Base was impregnated with aqueous ammonium molybdate, and calcined in air at 900° F.

*Catalyst K*—Same as catalyst J, using ammonium tungstate in place of ammonium molybdate.

*Catalyst L*—Base was impregnated with aqueous chromic acid, and calcined at 900° F.

*Catalyst M*—Base was impregnated first with aqueous cobalt nitrate, dried, then impregnated with aqueous ammonium molybdate, and calcined.

Each of the foregoing catalysts was then tested for hydrocracking activity using as feed a catalytic cracking cycle oil having the following characteristics:

| | |
|---|---|
| API gravity, 60° F | 21.3 |
| ASTM end point, °F | 673 |
| Weight percent sulfur | 0.92 |
| Weight percent nitrogen | 0.14 |
| Volume percent 400° F. end-point gasoline | 2.1 |
| Volume percent aromatics | 62 |

The processing conditions were as follows:

| | |
|---|---|
| Temperature | 900° F. |
| Pressure | 1000 p.s.i.g. |
| L.H.S.V. | 0.5. |
| H₂/liquid feed | 8000 s.c.f./bbl. |

The results were as follows:

Table 4

| Catalyst | Promoter | Gasoline yield after 4 hrs., C₄—400° F., volume percent of feed | Research octane number clear |
|---|---|---|---|
| Base | None | 36 | 87.5 |
| G | 1.1% NiS | 50 | 86.0 |
| H | 1.1% CoS | 50 | 87.0 |
| J | 1.2% MoO₃ | 57 | 82.0 |
| K | 1.2% WO₃ | 43 | 84.9 |
| L | 1.1% Cr₂O₃ | 43 | 85.8 |
| M | 0.5% CoO+0.5% MoO₃ | 50 | 86.6 |

By treating catalysts G and H with 6% ozone-oxygen at 85° F. for 8 hours (a somewhat longer treatment time is desirable in the case of sulfide catalysts), and then reducing with hydrogen for 2 hours at 200° F., and for 2 hours at 750° F., the respective activities are improved. The gasoline yields under the above conditions are increased about 4% in each case, with no loss in octane rating.

By treating the base, as well as catalysts J, K, L, M, and N, with 6% ozone-oxygen at 85° F. for 4 hours, followed by hydrogen reduction at 1100° F. for 2 hours, the respective activities are also improved to the extent that an average increase in gasoline yield of about 4-5% is obtained under the above conditions, usually with no loss in octane rating.

The foregoing examples demonstrate that the ozone treatment, followed by hydrogen reduction is a generally applicable procedure, resulting in substantial improvements in activity of transitional metal catalysts used in hydrogenation-dehydrogenation reactions. The disclosure of specific examples is hence not intended to be limiting in scope; the true scope of the invention is intended to be embraced by the following claims.

I claim:

1. In the preparation of a transitional metal hydrogenation-dehydrogenation catalyst supported on a difficultly reducible absorbent oxide carrier, the method of enhancing the activity thereof which comprises treating said supported catalyst in its calcined, activated form with ozone at a temperature between about —50° and 570° F. for a period of time sufficient to effect substantial absorption of ozone, then reducing the ozonized catalyst with hydrogen at a temperature which, at least during the terminal period of contacting, is between about 500° and 1200° F.

2. The method defined in claim 1, wherein said transitional metal is in the form of the free metal when subjected to said ozone treatment.

3. The method defined in claim 1, wherein said transitional metal is in the form of an oxide when subjected to said ozone treatment.

4. The method defined in claim 1, wherein said transitional metal is in the form of a sulfide when subjected to said ozone treatment.

5. The method defined in claim 1, wherein said transitional metal is in the form of a sulfate when subjected to said ozone treatment.

6. In a catalytic conversion process wherein a hydrocarbon is contacted with a catalyst in the presence of hydrogen at a temperature above about 500° F. to effect hydrogenation-dehydrogenation reactions, and wherein said catalyst comprises as an essential active ingredient a minor proportion of a transitional metal compound, said active ingredient being distended on a major proportion of a difficultly reducible absorbent oxide carrier, the improvement which comprises utilizing in said process a catalyst of the above description which has been further modified by treatment thereof in its calcined, activated form with ozone at a temperature between about —50° and 570° F. for a period of time sufficient to effect substantial absorption of ozone, and then reducing the ozonized catalyst with hydrogen at a temperature which, at least during the terminal period of contacting, is between about 500° and 1200° F.

7. A process as defined in claim 6 wherein said ozone treatment is carried out at a temperature between about 0° and 390° F.

8. A process as defined in claim 6 wherein said ozone treatment is carried out at a temperature between about 0° and 390° F., and wherein said hydrogen reducing step is carried out in two stages, first at a temperature between about 50° and 700° F., and then at a higher temperature between about 500° and 1200° F.

9. In a catalytic desulfurization process wherein a hydrocarbon fraction containing organic sulfur compounds is contacted with a catalyst in the presence of added hydrogen at a temperature of between about 600° and 900° F., and a pressure between about 50 and 5000 p.s.i.g., and wherein said catalyst comprises as the essential active ingredient a combination of (1) a compound selected from the class consisting of the oxides and sulfides in group VIII metals, and (2) a compound selected from the class consisting of the oxides and sulfides of group VI–B metals, said active ingredient being distended on a major proportion of a difficulty reducible adsorbent oxide carrier, the improvement which comprises utilizing in said process a catalyst of the above description which has been further modified by treatment thereof in its calcined, activated form with ozone at a temperature between about —50° and 570° F. for a period of time sufficient to effect substantial absorption of ozone, and then reducing the ozonized catalyst with hydrogen at a temperature which, at least during the terminal period of contacting, is between about 500° and 1200° F.

10. A process as defined in claim 9 wherein said catalyst consists essentially of a minor proportion of cobalt oxide plus molybdenum oxide supported on a carrier which is essentially alumina.

11. In a catalytic reforming process wherein a mineral oil fraction boiling in the gasoline range is contacted with a catalyst in the presence of added hydrogen at a temperature between about 800° and 1100° F., and at a pressure between about 100 and 600 p.s.i.g. to effect an improvement in octane rating, and wherein said catalyst comprises as an essential active ingredient a group VI–B metal oxide, said active ingredient being distended on a major proportion of a difficulty reducible adsorbent oxide carrier, the improvement which comprises utilizing in said process a catalyst of the above description which has been further modified by treatment thereof in its calcined, activated form with ozone at a temperature between about —50° and 570° F. for a period of time sufficient to effect substantial absorption of ozone, and then reducing the ozonized catalyst with hydrogen at a temperature which, at least during the terminal period of contacting, is between about 500° and 1200° F.

12. In a catalytic reforming process wherein a mineral oil fraction boiling in the gasoline range is contacted with a catalyst in the presence of added hydrogen at a temperature between about 800° and 1100° F., and at a pressure between about 100 and 600 p.s.i.g. to effect an improvement in octane rating, and wherein said catalyst comprises as an essential active ingredient a metal selected from the class consisting of rhodium, palladium, and platinum, said active ingredient being distended on a major proportion of a difficulty reducible adsorbent oxide carrier, the improvement which comprises utilizing in said process a catalyst of the above description which has been further modified by treatment thereof in its calcined, activated form with ozone at a temperature between about —50° and 570° F. for a period of time sufficient to effect substantial absorption of ozone, and then reducing the ozonized catalyst with hydrogen at a temperature which, at least during the terminal period of contacting, is between about 500° and 1200° F.

13. In a catalytic reforming process wherein a mineral oil fraction boiling in the gasoline range is contacted with a catalyst in the presence of added hydrogen at a temperature between about 800° and 1100° F., and at a pressure between about 100 and 600 p.s.i.g. to effect an improvement in octane rating, and wherein said catalyst comprises as the essential active ingredients metallic nickel plus nickel sulfide, said active ingredients being distended on a major proportion of a difficulty reducible adsorbent oxide carrier, the improvement which comprises utilizing in said process a catalyst of the above description which has been prepared by treating a supported nickel sulfate catalyst in its calcined, activated form with ozone at a temperature between about −50° and 570° F. for a period of time sufficient to effect substantial absorption of ozone, and then reducing the ozonized catalyst with hydrogen at a temperature which, at least during the terminal period of contacting, is between about 500° and 1200° F.

14. In a catalytic hydrocracking process wherein a hydrocarbon fraction boiling above the gasoline range is contacted with a catalyst in the presence of added hydrogen at a temperature between about 800° and 1100° F., and a pressure between about 500 and 5000 p.s.i.g. to effect a substantial conversion of said hydrocarbon fraction to hydrocarbons boiling in the gasoline range, and wherein said catalyst comprises as an essential active ingredient a minor proportion of a transitional metal compound, said active ingredient being distended on a major proportion of a difficulty reducible adsorbent oxide carrier which contains a substantial amount of silica and possesses acidic cracking activity, the improvement which comprises utilizing in said process a catalyst of the above description which has been further modified by treatment thereof in its calcined, activated form with ozone at a temperature between about −50° and 570° F. for a period of time sufficient to effect substantial absorption of ozone, and then reducing the ozonized catalyst with hydrogen at a temperature which, at least during the terminal period of contacting, is between about 500° and 1200° F.

15. A process as defined in claim 14 wherein said carrier is a coprecipitated mixture consisting essentially of between about 10% and 30% by weight of silica, 15% to 65% of zirconia, and 15% to 65% of titania.

16. A process as defined in claim 14 wherein said active ingredient is selected from the class consisting of the oxides and sulfides of nickel, cobalt, chromium, molybdenum and tungsten.

17. A catalyst composition consisting essentially of (1) a major proportion of a difficulty reducible adsorbent oxide carrier, and (2) a minor proportion of cobalt oxide plus molybdenum oxide, said catalyst having been prepared by impregnating said carrier with soluble salts of cobalt and molybdenum, drying the impregnated carrier, treating the dried carrier with ozone at a temperature between about −50° and 570° F. for a period of time sufficient to effect substantial absorption of ozone, and then reducing the ozonized catalyst with hydrogen, first at a temperature between about 50° and 700° F., and then at a substantially higher temperature between about 500° and 1200° F.

18. A catalyst composition consisting essentially of (1) a major proportion of a difficulty reducible adsorbent oxide carrier, and (2) a minor proportion of metallic nickel plus nickel sulfide, said catalyst having been prepared by impregnating said carrier with nickel sulfate, drying the impregnated carrier, treating the dried carrier with ozone at a temperature between about −50° and 570° F. for a period of time sufficient to effect substantial absorption of ozone, and then reducing the ozonized catalyst with hydrogen, first at a temperature between about 50° and 700° F., and then at a substantially higher temperature between about 500° and 1200° F.

References Cited in the file of this patent

UNITED STATES PATENTS

| | | |
|---|---|---|
| 2,687,370 | Henricks | Aug. 24, 1954 |
| 2,781,324 | Haensel | Feb. 12, 1957 |
| 2,794,005 | Lefrancois | May 28, 1957 |

OTHER REFERENCES

Mellor's Modern Inorganic Chemistry, Longman, Green and Co., New York, 1939, page 315.